United States Patent [19]

Walrave et al.

[11] 4,171,718

[45] Oct. 23, 1979

[54] ANTI-SKID FITTINGS FOR TIRES

[75] Inventors: Jean Walrave, Meylan; Jean Champiot, Seyssins, both of France

[73] Assignee: Ugine Carbone, Grenoble, France

[21] Appl. No.: 889,870

[22] Filed: Mar. 24, 1978

Related U.S. Application Data

[63] Continuation-in-part of Ser. No. 691,981, Jun. 2, 1976, abandoned.

[30] Foreign Application Priority Data

Jun. 3, 1975 [FR] France .................... 75 17852

[51] Int. Cl.² ............... B60C 27/00; B60C 27/06
[52] U.S. Cl. ........................... 152/222; 152/226
[58] Field of Search ........... 152/222, 221, 210, 179, 152/191, 226

[56] References Cited

U.S. PATENT DOCUMENTS

| | | | |
|---|---|---|---|
| 1,753,349 | 4/1930 | Perks | 152/222 |
| 2,850,068 | 9/1958 | Clifton | 152/222 |

Primary Examiner—Richard A. Bertsch
Attorney, Agent, or Firm—Dennison, Dennison, Meserole & Pollack

[57] ABSTRACT

A flexible anti-skid fitting for mounting on tires to aid winter driving of automotive vehicles and trucks, comprising independent strips placed across the tread of the tires and held at their ends by a known means. The strips are characterized in that each strip includes: (a) on its outer surface towards the road, molded-on profiles which are fitted with studs located on both the lateral shoulders and the central region; (b) on its inner surface which comes in contact with the tire, pointed rigid molded-on profiles specifically aligned with and/or provided immediately around the base of the studs. Additional molded-on profiles can be provided spaced about the remainder of the inner surface.

7 Claims, 11 Drawing Figures

ANTI-SKID FITTINGS FOR TIRES

This is a continuation-in-part of copending application Ser. No. 691,981, for Anti-Skid Fittings For Tires, filed June 2, 1976 now abandoned.

This invention concerns a new improved flexible anti-skid fitting for mounting on tires to aid automobiles and heavy trucks in driving over slippery highways in winter, particularly under conditions of snow or glazed frost.

For a long time experts have been trying to perfect anti-skid studs which are placed in the tread of tires to improve their grip on roads covered with snow or glazed frost. Although considerable progress has been achieved in perfecting rubber and special profiles for the tires used on vehicles during the winter period, and although it has for some years been the general practice to clear roads of snow, there were still serious dangers due to occasional glazed frost and frozen snow. In such cases it proved necessary to resort to studs which preferably would not interfere with the grip of the tire on a dry road and would not cause serious deterioration of the highway. However it is unquestionable that the use of anti-skid studs made it necessary either to fit the vehicle with studded tires throughout the whole winter period, or to carry out successions of tire fitting and tire removing operations depending on climatic conditions.

Experts long ago proposed the use of chains for fitting on any type of tires as an exceptional means of enabling a vehicle to be driven through fresh snow. However, such a practice has serious disadvantages which it is important to emphasize. Thus, a vehicle equipped with such chains cannot drive for any distance along a dry highway. Further, its speed in fresh snow is low and always much lower than that which can be obtained with winter-profile or snow tires, whether or not they are fitted with studs. Another drawback is the well-known ineffectiveness of such chains in improving the grip of tires on very hard snow, ice or glazed frost. Worse still, the chains cause periodic shocks which may lead to mechanical damage to the driving or transmission components of the vehicle.

With these disadvantages in mind, we have carried out research in this field and perfected a new, removable anti-skid fitting for mounting on tires. This design comes halfway between conventional snow chains and studded tires.

We have now discovered and perfected a new, improved, flexible anti-skid fitting for mounting on tires to aid automotive vehicles and heavy trucks in winter driving. Independent strips are placed across the tread of the tire and held at the ends by a known means, said strip comrises: (a) on its outer surface towards the highway molded-on profiles fitted with studs and located in both lateral shoulders and in central profiles; (b) on its inner surface which comes into contact with the tire, pointed, molded-on profiles generally spread over said surface and specifically aligned with and/or provided around the base of the studs.

The flexible anti-skid fitting according to the invention comprises a set of strips, placed across the tread of the tire and fixed by any means known in the art. For example, the strips may be held in position by chains extending around the tire and rigidly connected to the ends of the strips. Thus, the set of strips forms the new, flexible tread to counter skidding on a slippery road, replacing the actual tread of the tire.

The subject matter of the invention will be better understood from the detailed description which follows. This description refers by number to the strips, illustrated in the accompanying drawings, which form the new flexible anti-skid fitting.

Figure 8:
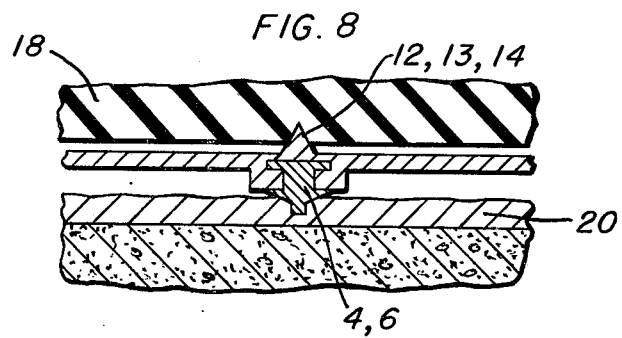
Figure 9:
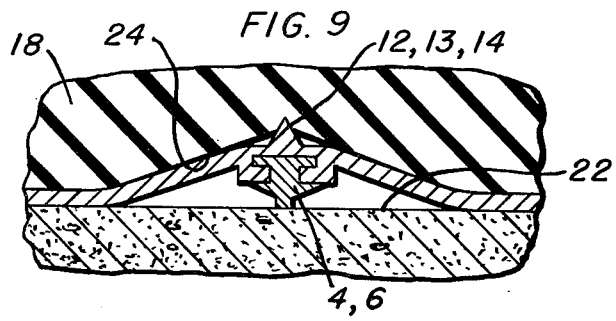
Figure 10:
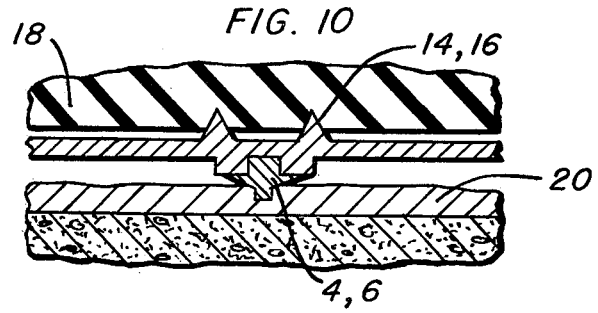
Figure 11:
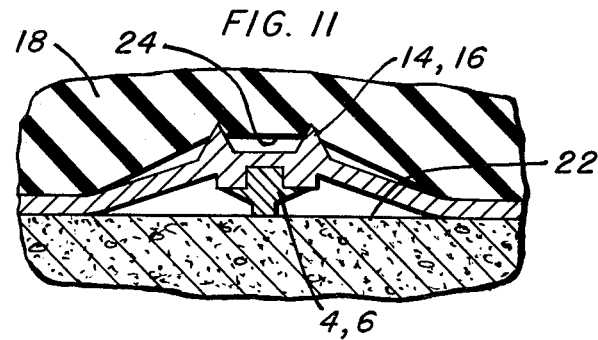

FIG. 8 schematically illustrates engagement of a stud, having an associated aligned inner profile or projection, with a road surface having ice or snow thereon;

FIG. 9 schematically illustrates the manner in which the alignment of an inner profile with a stud, as in FIG. 8, enables a substantially total retraction of the stud upon engagement with a dry pavement;

FIG. 10 schematically illustrates engagement of a stud, having inner profiles or projections about the base of the stud, with a road surface having ice or snow thereon; and FIG. 11 schematically illustrates the manner in which the provision of inner profiles about the base of a stud, as in FIG. 10, enables a substantially total retraction of the stud upon engagement with a dry pavement.

The outer surface 1 of the strip according to the invention is fitted with molded-on profiles or blocks 2 and 3 forming lateral shoulders, each block being itself fitted with at least one stud 4. The lateral shoulder forming blocks 2 and 3 may be of various shapes, specially studded and adapted so as to give the vehicle excellent lateral ability. In the case of the modification of FIG. 6, for example, the lateral shoulders are formed by the set of blocks 2, 3 and 10. If at least one stud 4 is attached to each shoulder of the strip formed by at least one block such as 2, the vehicle will be kept on course and prevented from deviating at bends, while also benefiting from the best driving and braking properties.

Figure 4:
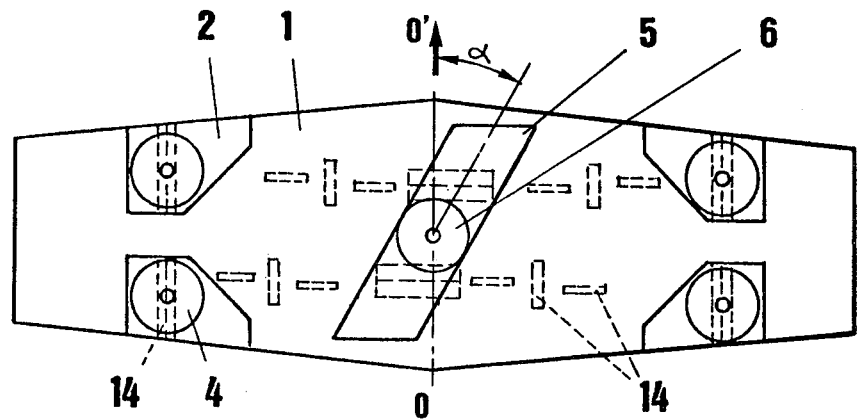
FIGS. 4, 5 and 6 show the various modified profiles molded onto the outer surface (continuous lines) and the inner surface (broken lines), as nonrestrictive examples.

Outer surface 1 also has upwardly extending central profiles 5. These may vary in shape, e.g., from a chevron (FIG. 1) to a projection in the form of a parallelepiped inclined to the right or left of the axis 00' of the tread (FIG. 4), or two projections in the form of parallel parallelepipeds maintaining an identical inclination to that axis (FIG. 5), or a centered cross or even more complex arrangements combining parallelepipeds such as that illustrated in FIG. 6. In particular, the inclination of each central profile to directional axis 00' may vary by a positive angle $\alpha$ to the right and a negative angle $\alpha$ to the left, which may vary e.g., from 30° to 45°.

The thickness of the lateral shoulder blocks or profiles and central profiles may vary from 2 to 8 millimeters but preferably from 3 to 5 millimeters for conventional automobiles, whereas for heavy trucks it will vary from 4 to 12 millimeters but preferably from 5 to 10 millimeters.

Figure 1:
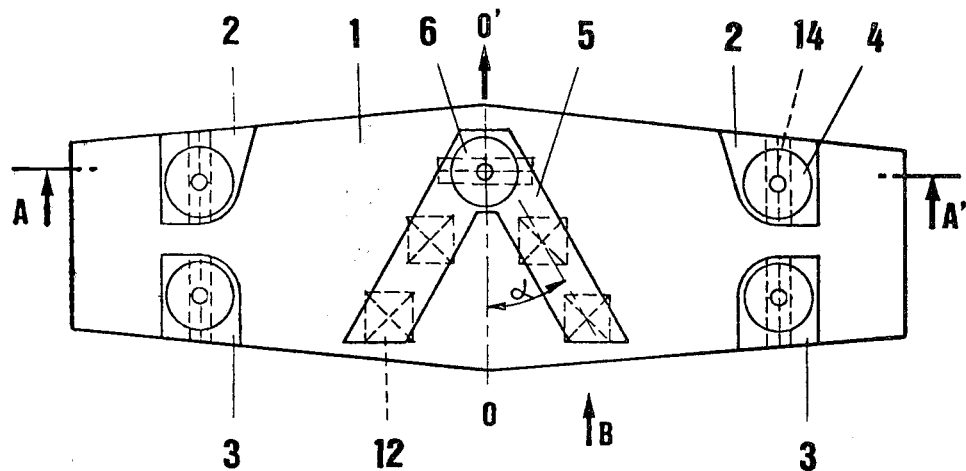
FIG. 1 is a plan view of the outer surface, towards the road, of a strip with molded-on profiles fitted with studs, the profiles molded onto the inner surface being shown in broken lines.
Figure 5:
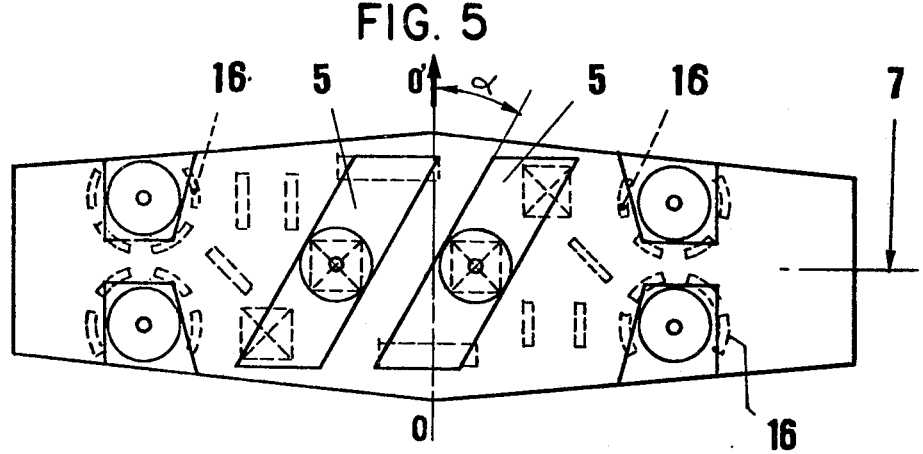

In addition, each of the central profiles is fitted with at least one anti-skid stud. In the case of FIG. 1, for example, chevron-shaped central profile 5 has only one stud 6, located in the apex region, while in the case of FIGS. 4 and 6 the stud is located at the geometric center of the strip, on the corresponding central profile 5. In the case of FIG. 5, parallel central profiles 5 each have at least one stud centered e.g., on the transverse axis 7.

Figure 6:
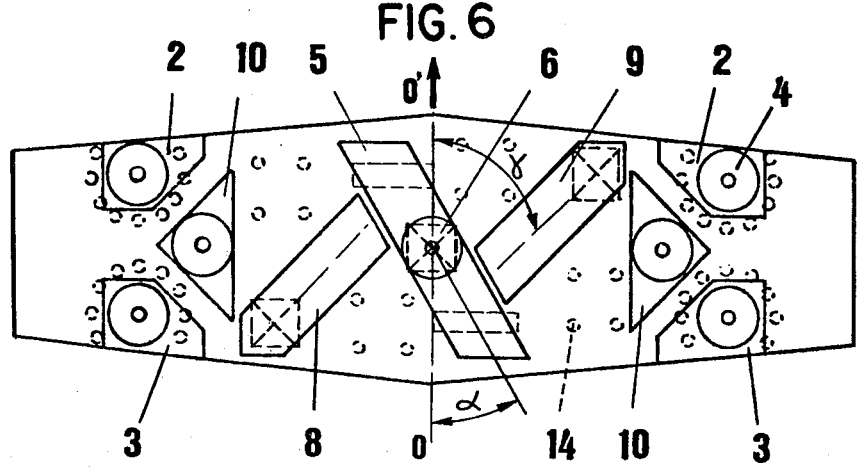

The same applies to FIG. 6 where the central profiles are formed by projections 5, 8 and 9, only projection 5 being equipped with a stud. But obviously projections 8 and 9 may themselves receive at least one stud.

Generally speaking, the number of studs attached to the lateral and central profiles of the strip will vary according to the weight and power of the vehicle and the dimensions of the strip, such as the width and length required to fit it to the tire.

We have also found, and this is a preferred feature of the invention, that it is particularly advisable for the active end of the stud attached to the geometric center of the strip to be at a level about 1 to 3 millimeters lower than the active ends of the studs on the lateral shoulders.

Consequently, the preferred difference in level between the studs on the lateral shoulders and those on the central profiles helps to compensate for the curvature of the tires when the strips are mounted on them. Over and above the first effect, the difference in level is found to give increased effectiveness to the studs on the lateral shoulders; finally, it is found to encourage reduction in pressure on the ground at the center of the strip, thus avoiding any slipping of the vehicle on dry ground.

Figure 2:
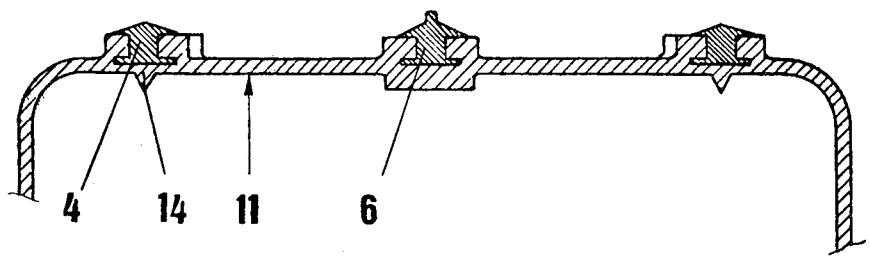
FIG. 2 is a cross-section through the strip taken along the line AA' of FIG. 1.

As for the inner surface 11 of the strip according to the invention (FIGS. 2 and 3), this has pointed rigid molded-on profiles in the form of pyramids with a square or rectangular base (FIG. 3, reference 12), prisms (FIG. 3, references 13 and 14), cones (FIG. 6, reference 14), or curved bodies of triangular section (FIG. 5, reference 16) combined in lines, circles, crosses or any other geometrical figure.

The pointed profiles are preferably aligned with the studs or at least arranged closely around the base of each stud, the maximum distance between them and the edge of the base being 5 millimeters in the case of automobiles.

The number of pointed inner profiles, their shape and position depend essentially on the thickness of the strip, the weight of the vehicle and the dimensions of the stud and its base. The pointed profiles stabilize the strip on the tire by preventing any slipping of the strip, especially when the vehicle is accelerating, decelerating, or turning, and also have a deflecting action to prevent any shifting of the strip along the axis of the axle of the vehicle.

Apart from these aspects, which are important in themselves, we have found that the presence of pointed profiles on the inner surface 11 of the strip, in the manner proposed by the invention, causes the active tip of the stud to be retracted under stress greater than what would normally be encountered on icy roads and the like. In fact, the tip of the stud may be totally retracted for a very short time by displacement of the stud radially inward of the tire. This will occur, for example, when a vehicle, equipped with fittings comprising strips according to the invention, is driving over dry or clear pavement and undergoes acceleration or deceleration, or executes a turn. This idea of retraction under stress is comparable with what is at present required of studded tires, with total retraction of the stud involving a force of 15 Kg per tip.

This significant feature of the invention will possibly be best understood from FIGS. 8, 9, 10 and 11, which illustrate a stud under minimal or normal operating load and the same stud under greatly increased loading conditions, such as occurs on dry roads, particularly during rapid acceleration, deceleration or turning.

Figure 3:
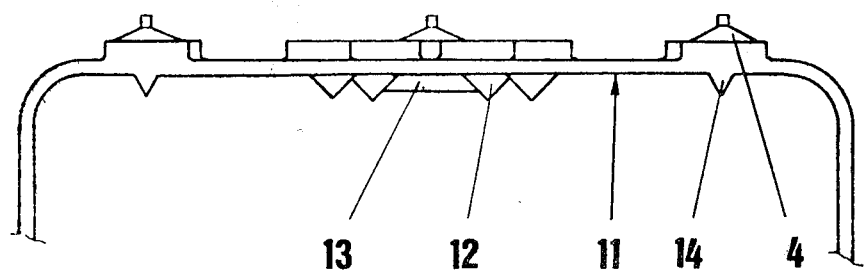
FIG. 3 is a front view seen in the direction of arrow B in FIG. 1 showing some details of the structures on the two surfaces of the strip and the attached studs.

FIGS. 8 and 9 are specifically directed to a strip wherein the pointed profile, such as profiles 12, 13 or 14 as in FIG. 3, are directly aligned or coaxial with the stud 4 or 6. FIGS. 10 and 11 are concerned with a strip wherein the pointed profiles, for example 14 or 16 of FIGS. 5 and 6 respectively, are aligned about the base of the stud 4 or 6.

In each case, FIGS. 8 and 10 illustrate the strips mounted on or over a tire tread 18 and engaged with an icy or snow covered road surface 20. FIGS. 9 and 11 illustrate the corresponding strips engaged with a dry or clean road surface 22.

When, as in FIGS. 8 and 10, the projecting stud tip engages in ice or snow covered surface 20, the tip will engage within the ice or snow surface and provide the desired traction. At the same time, there will be a tendency for the inner profiles or projections to engage within the surface tread of the tire 18 so as to stabilize the strip relative to the tire.

Under conditions of extreme stress, for example when rapidly accelerating or decelerating, or when executing a turn, there will be a substantially increase tendency for the stud to dig into the roadway surface, thus providing for an enhanced gripping when driving on snow, icy snow, or the like. By the same token, when driving on a dry or clean road surface, as 22, and particularly under conditions of high stress such as acceleration, deceleration or turning, the load or force generated at the stud tip is accommodated by a unique retraction of the stud. This retraction of the studs is specifically provided for by the previously described orientation of the inner sharp profiles or projections in either direct alignment with the studs, as in FIGS. 8 and 9, or immediately about the base thereof as in FIGS. 10 and 11. In each instance, the inner projections concentrate the force developed on the stud tip within a small area immediately below and in alignment with the stud. This concentration of force in turn causes a greater than normal, and in fact substantial, indentation of the tire tread in alignment with the stud. Such an indentation has been schematically shown at 24 in FIGS. 9 and 11 and allows for an accommodation of the strip about the stud within the formed indentation, thereby effecting a positive retraction of the stud to a degree not possible in the absence of directly or closely aligned inner projections which in turn specifically provide the aligned indentation and the accommodation of the stud.

By providing for the retraction of the studs in this manner, the high rate of wear normally experienced on both the road surface and the studs when using conventional studded strips is avoided. For example, in the conventional stud strip wherein no provision is made for retraction of the studs, particularly under extreme stress conditions, the forces concentrated at the tips of the studs cause a positive gouging, scratching and pitting of the road surface, in conjunction with substantial and damaging wear on the studs themselves. The present invention, by providing for a retraction of the active tips of the stud, distributes the road engagement generating stresses to the entire outer surface of the strip which in effect functions as the tire tread.

As a point of interest, actual experiments have been conducted with the French road authorities with these experiments showing that studded strips constructed in accordance with the present invention result in a significant reduction in road surface wear. Further, it has been found that vehicles equipped with such strips, because of the specific provision for retraction of the studs, can be driven at high speed without noticeable vibration. This latter feature is also considered of particular significance when viewed in light of the substantial vibrations which are normally generated by more conventional strips wherein no provision is made for retraction of the studs thereon.

The anti-skid strip according to the invention consequently provides the basic advantages of good snow and ice traction, and the significant added advantages of perfect running of vehicles on dry ground as well as virtually zero wear on road surfaces.

Figure 7:
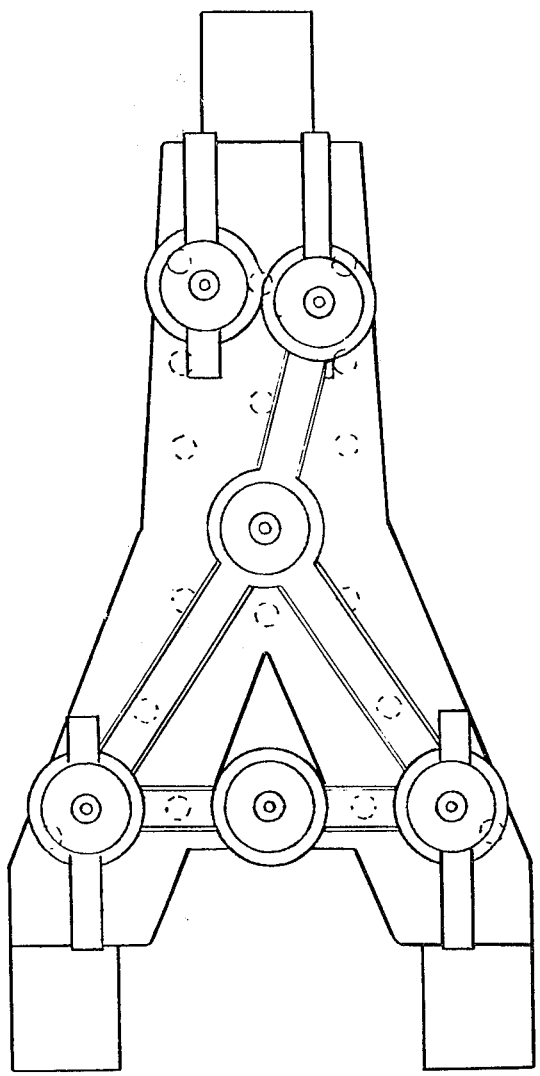
FIG. 7 shows an example of a particular Y-shape of a strip.

The strips according to the invention, which may take various geometrical forms but more particularly elliptical or lozenge shape or dissymmetrical, or Y-shape as illustrated by FIG. 7, are made of strong, flexible polymeric materials which may be molded and possibly reinforced with metal or textile fibers or with woven or knitted components.

The studs used in the invention are of known types. They may be made of hammered or cutting-grade steel or of sintered iron and may have a tip made of a particularly hard material such as tungsten carbide.

The strips according to the invention, forming the new anti-skid fittings, enable speeds of about 70 Km/hour to be reached, with excellent road holding comfort never heretofore achieved with chains and without mechanical deterioration of the vehicle.

Safety on fresh snow, hard snow, ice or glazed frost and even on dry ground is comparable with that provided by the best snow tires fitted with studs.

We claim:

1. A flexible anti-skid attachment for a vehicle tire to aid in winter driving, comprising an independent traction strip adapted to be placed across the tread of a tire, means for securing said strip on said tire, said strip having an outer road-engaging surface and an inner tire-engaging surface, said strip having on its outer road-engaging surface an integral central raised area and integral raised shoulder blocks spaced laterally to each side of the central raised area, at least one outwardly extending central stud having a base embedded in said central raised area, at least one stud having a base embedded in each shoulder block and extending outwardly therefrom, and sharp profile tire contacting means integrally molded on the inner surface of said strip and projecting therefrom for contact with the tire, selected ones of said sharp tire contacting means being specifically located opposite to and adjacent the bases of each of said studs for enabling substantially complete retraction of the studs upon contact with a clear road.

2. A flexible anti-skid attachment as defined in claim 1 wherein said raised area comprises combinations of parallelepipeds.

3. A flexible anti-skid attachment as defined in claim 1 wherein there is a difference of between 1 to 3 millimeters in level between said central stud and the studs extending from said shoulder blocks.

4. A flexible anti-skid attachment as defined in claim 1 wherein the molded inner surface tire contacting means are pyramidal in shape.

5. A flexible anti-skid attachment as defined in claim 1 wherein the molded inner surface tire contacting means are conical in shape.

6. A flexible anti-skid attachment as defined in claim 1 wherein the molded tire contacting means are molded around the base of each stud and are at a maximum distance of 5 millimeters from the edge of the base of each stud.

7. A flexible anti-skid attachment as defined in claim 1 wherein said integral central raised area comprises at least one elongated generally transverse central projection.

* * * * *